United States Patent
Bhaskaran et al.

(10) Patent No.: US 9,088,752 B2
(45) Date of Patent: Jul. 21, 2015

(54) GENERATING A PRINT PREVIEW

(75) Inventors: Shinoj Bhaskaran, Bangalore Karnataka (IN); Ruby Tomar, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 97 days.

(21) Appl. No.: 13/523,915

(22) Filed: Jun. 15, 2012

(65) Prior Publication Data

US 2013/0335756 A1    Dec. 19, 2013

(51) Int. Cl.
G06F 15/00 (2006.01)
B41J 2/195 (2006.01)
H04N 1/60 (2006.01)

(52) U.S. Cl.
CPC ........... *H04N 1/6013* (2013.01); *H04N 1/6011* (2013.01)

(58) Field of Classification Search
USPC .................................................. 358/1.9, 518
See application file for complete search history.

(56) References Cited

U.S. PATENT DOCUMENTS

| | | | | |
|---|---|---|---|---|
| 4,639,770 | A * | 1/1987 | Jung et al. | 358/527 |
| 6,345,891 | B1 * | 2/2002 | Childers et al. | 347/87 |
| 7,148,977 | B2 * | 12/2006 | Zerza et al. | 358/1.14 |
| 7,239,412 | B2 | 7/2007 | Leslie | |
| 7,483,166 | B2 | 1/2009 | Kadio et al. | |
| 2005/0253866 | A1 * | 11/2005 | Kim et al. | 345/594 |
| 2007/0024490 | A1 * | 2/2007 | Carter et al. | 342/36 |
| 2007/0188539 | A1 * | 8/2007 | Saruta | 347/19 |

* cited by examiner

*Primary Examiner* — Barbara Reinier
(74) *Attorney, Agent, or Firm* — Hewlett-Packard Patent Department

(57) ABSTRACT

In an embodiment, a processor-readable medium stores code representing instructions that when executed by a processor cause the processor to receive a request for a print-preview of an image, convert RGB data of the image to CMYK data, convert the CMYK data to converted RGB data, and generate the print-preview of the image with the converted RGB data.

19 Claims, 6 Drawing Sheets

Ink Level Table — 220

| | Cyan | Magenta | Yellow | Black |
|---|---|---|---|---|
| Actual levels retrieved before the print job | 76% | 82% | 16% | 56% |
| After Swath 1 | 74% | 80% | 16% | 56% |
| After Swath 2 | 72% | 78% | 16% | 56% |
| After Swath 3 | 70% | 76% | 16% | 56% |
| After Swath 4 | 68% | 74% | 16% | 56% |
| After Swath 5 | 66% | 72% | 16% | 56% |
| After Swath 6 | 66% | 72% | 16% | 54% |
| After Swath 7 | 66% | 72% | 16% | 52% |
| After Swath 8 | 66% | 72% | 16% | 50% |
| After Swath 9 | 66% | 72% | 16% | 48% |
| After Swath 10 | 66% | 72% | 16% | 46% |
| After Swath 11 | 66% | 72% | 14% | 46% |
| After Swath 12 | 66% | 72% | 10% | 46% |
| After Swath 13 | 66% | 72% | 8% | 46% |
| After Swath 14 | 66% | 72% | 6% | 46% |
| After Swath 15 | 66% | 72% | 4% | 46% |

Fig. 3

Print Quality LUT ← 222

| Ink Level (%) Remaining | Ink Quality Level (%) |
|---|---|
| 100 ⋮ | 100 ⋮ |
| 15 | 100 |
| 14 | 95 |
| 13 | 90 |
| 12 | 85 |
| 11 | 80 |
| 10 | 75 |
| 9 | 70 |
| 8 | 65 |
| 7 | 60 |
| 6 | 55 |
| 5 | 50 |
| 4 | 40 |
| 3 | 30 |
| 2 | 20 |
| 1 | 10 |
| 0 | 0 |

Fig. 5

GENERATING A PRINT PREVIEW

BACKGROUND

Most applications include a print preview function that allows a user to view pages of a document or other image on a computer monitor or screen prior to printing the pages on a printer. The print preview function enables the user to view the layout of a document and decide if there are changes that should be made before printing out the document. The print previews are generated by the applications themselves, and they show document pages from the perspective of the applications settings. However, print previews often do not accurately represent the actual output a user will see in the printed documents.

BRIEF DESCRIPTION OF THE DRAWINGS

The present embodiments will now be described, by way of example, with reference to the accompanying drawings, in which:

FIG. 3 shows an example of an ink level table, according to an embodiment;

FIG. 5 shows an example of a print quality LUT, according to an embodiment;

DETAILED DESCRIPTION

Overview

Figure 1:
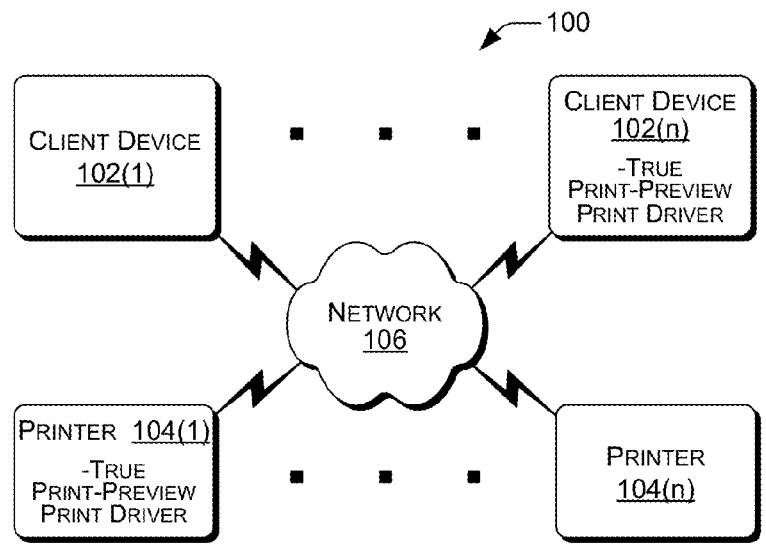
FIG. 1 shows an exemplary environment suitable for generating print previews, according to an embodiment.

As generally noted above, a document print preview is generated by an application from the perspective of application-specific settings selected by a user from within a print preview page or dialog box presented by the application. The application-specific settings allow the user to set properties such as the document margins, orientation, pages per sheet, and so on. When the user proceeds by selecting "print", either from within the print preview dialog or directly from the application menu, a "print" dialog box appears. The print dialog box is generated by the application, and it includes a "properties" button. When the user selects the "properties" button, a second dialog box appears. The second dialog box is generated by the print driver associated with the printer on which the document will be printed. The second dialog box enables the user to make printer-specific settings for printing the document, such as the print quality, printing in grayscale, adding a watermark to the printed document (e.g., confidential, sample, draft), and so on.

When an application generates a print preview of a document, it incorporates the application-specific settings selected by the user through the applications print preview dialog, but it does not account for the printer-specific properties selected by the user through the print dialog box. The application is unaware of these printer-specific properties. Thus, the print preview of a document presented by the application on a computer monitor is often not a true representation of what the document will look like when it is printed on the printer. For example, if a user elects to print a color document in grayscale by selecting the grayscale property from within the print dialog box, the color document will print from the printer in grayscale, but the document print preview presented on the computer monitor by the application will show the document in color.

In addition to not accounting for such user-selected printer properties, an application-generated document print preview also does not account for some other key factors that can cause the print preview to look different than the actual printed document. One such factor not accounted for in the print preview is the color map conversion from RGB color space to CMYK color space that occurs prior to printing a document. Computer monitors display documents in RGB color (by emitting light in different RGB (red, green, blue) color combinations), while documents are printed on paper and other media in CMYK color (cyan, yellow, magenta, black). The CMYK ink colors act as filters to absorb varying amounts of colors from white light reflecting off the paper. Because the RGB color gamut (i.e., color range) is larger than the CMYK color gamut, some colors that can be displayed on a computer monitor in RGB color cannot be displayed when printed on paper in CMYK color. While all CMYK colors can be produced in the RGB gamut, not all RGB colors can be produced in the CMYK gamut. Prior to printing a document, the document content data is converted to PCL (printer control language) by converting the RGB color data to CMYK color data. Because some RGB colors do not convert to an exact CMYK color counterpart, documents presented in print previews on a computer monitor can look different than they do when printed out from a printer.

In addition, the conversion from RGB color to CMYK color is made by the print driver using a color map that is specific to the printer on which the document is being printed. That is, the color mapping from RGB to CMYK can be different for different printers. Therefore, while a document print preview may have a particular appearance on a computer monitor, the printed document may have varying appearances depending on which printer it is printed from. Thus, neither the RGB-CMYK color conversion, nor the particular color mapping of specific printers are accounted for by applications when generating document print previews.

Another factor that can cause a document print preview to look different than the actual printed document is the level of ink remaining in the printer. Applications generating document print previews do not consider the actual ink levels in the printers on which the documents will be printed. As ink levels for different ink colors (CMYK) are depleted from printer cartridges (or from other ink supplies), when they reach certain minimum threshold levels, the quality of printed colors produced using those inks begins to diminish. However, applications that generate document print previews for display on computer monitors do not account for this diminished print quality resulting from the reduced ink levels. Thus, document print previews may not accurately represent how the document will appear when it is printed by the printer.

Embodiments of the present disclosure provide a print preview that realistically matches the appearance of a document or image on a display device (e.g., a computer monitor or screen) with the appearance of the document or image when it is printed on a printer. It is noted that the terms "document" and "image" are used interchangeably throughout this description to refer to any document and/or image that can be displayed on a display device (e.g., on a computer monitor, screen, etc.) and printed on a printer. In the described embodiments, the realistic/true print preview is generated by the print driver, and not by the application. Instead of creating the PCL when the user selects the "print" option, the driver creates the PCL when the user selects the "print preview" option. The RGB color data from the document content data is converted to CMYK color data using the color map for the chosen printer. After appropriate quality adjustments are made to the CMYK data values based on printer ink levels (as noted below), the CMYK data values are then mapped back to "converted" RGB data values which are used for generating the true print preview. Later, if the user actually prints the document, the PCL is already available and does not need to be regenerated by the driver. Because printers can have different color maps and varying ink levels, the true print preview may differ for the same document depending on which printer is chosen. However, the true print preview for a given printer will account for the specific color mapping and specific ink levels for the printer, and it will closely match the printed output from that printer.

To account for printer ink levels when generating the print preview, the driver communicates with the printer to retrieve ink levels for all of the ink cartridges or supplies. Using the PCL generated from the document content data, the driver knows the amount of ink needed to print each swath of the PCL data, and it generates an ink level table that projects the amounts of ink that will remain within the cartridges after each swath is printed. If ink levels in the table are sufficient, the CMYK data values (i.e., as converted from the RGB data values, as noted above) are retained. However, if ink levels in the table drop below certain threshold levels, the CMYK data values are adjusted according to a print quality LUT (look up table) that associates ink levels with print quality levels. Upon converting the CMYK data values back to converted RGB data values, the driver then draws each swath of the document print preview. Thus, the print preview is a true preview of a document that accounts not only for application-specific properties, but also for printer-specific color mapping, printer-specific ink levels, and other printer-specific properties such as print quality settings, printing in grayscale, the inclusion of watermarks, and so on.

In one example embodiment, a processor-readable medium stores code representing instructions that when executed by a processor cause the processor to receive a request for a print-preview of an image. In response to the request, the processor converts RGB data of the image to CMYK data, and then converts the CMYK data back into converted RGB data. The processor then generates the print-preview of the image using the converted RGB data. This process eliminates differences between the print preview and the printed image that might otherwise be present due to the color map conversion between the RGB and CMYK color spaces. In another implementation, the instructions further cause the processor to adjust the CMYK data based on ink levels in a printer prior to converting the CMYK data back to the converted RGB data. This process ensures that any print quality effects that might appear in the printed image due to insufficient printer ink levels, will also appear in the print preview.

In another example embodiment, a printer includes a print driver to generate a print preview of an image. The print driver uses ink levels retrieved from the printer to generate the print preview. In one implementation, print quality levels are associated with the ink levels through a print quality LUT.

In another example embodiment, a processor-readable medium stores code representing instructions that when executed by a processor cause the processor to convert RGB color data of an image into CMYK color data, retrieve initial CMYK ink levels from a printer, approximate subsequent CMYK ink levels that will remain in the printer based on amounts of ink that will be printed in each print swath of the image, adjust the CMYK color data for any ink levels that fall below a threshold level, convert the CMYK color data back to converted RGB color data, and generate a print preview using the converted RGB color data.

Illustrative Embodiments

FIG. 1 shows an exemplary environment 100 suitable for generating print previews, according to an embodiment of the disclosure. Environment 100 includes one or more client computing devices 102 coupled to one or more printers 104 through a network 106. In different implementations, any one or more of client computing devices 102 and/or printers 104 can include a "true print-preview print driver". Network 106 is intended to represent any of a variety of conventional network topologies and types (including optical, wired and/or wireless networks), employing any of a variety of conventional network protocols (including public and/or proprietary protocols). Network 106 may include, for example, a home network, a corporate network, or the Internet, as well as one or more local area networks (LANs) and/or wide area networks (WANs) and combinations thereof. Network 106 may also include a cable or other suitable local communication link.

Figure 2:
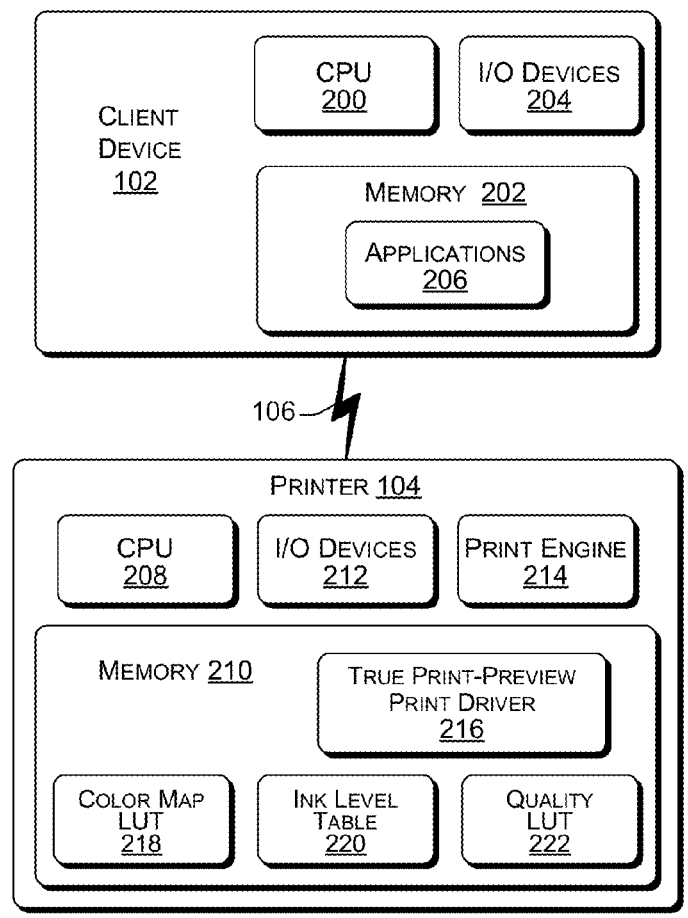
FIG. 2 shows a more detailed box diagram representation of one implementation of the exemplary environment of FIG. 1, including a client computing device and a printer, according to an embodiment.

FIG. 2 shows a more detailed box diagram representation of one implementation of the exemplary environment 100 of FIG. 1, including a client computing device 102 and a printer 104, according to an embodiment of the disclosure. Client device 102 may be implemented as any of a variety of conventional computing devices configurable to communicate with a printer 104 over a network 106 including, for example, a wireless communications device such as a cellular telephone or smart phone, a personal digital assistant (PDA), a tablet PC or other portable computer, a handheld PC, a desktop PC, a workstation, a set-top box, combinations thereof, and so on. Client device 102 generally includes a processor (CPU) 200 and a memory 202. Memory 202 typically includes both volatile (i.e., RAM) and nonvolatile (e.g., ROM, hard disk, floppy disk, CD-ROM, etc.) memory components. The memory components of memory 202 comprise processor-readable media that provide storage of computer/processor-readable coded instructions, data structures, program modules and other data for client computing device 102. Client device 102 also typically includes various input/output devices 204 such as a keyboard, a mouse, and a display device such as a monitor or touch screen, etc.

Client device 102 may implement (i.e., by execution on a processor 200) various application programs 206, such as word processing applications, image editing applications, web browsing applications, and so on. Such applications 206 may generate, capture, manipulate or otherwise prepare various documents (i.e., documents, images, pages, etc.) for a variety of purposes, including sending such documents over a network 106 to a printer 104 for printing. In some implementations, as shown in FIG. 1, client device 102 may additionally implement a "true print-preview print driver" to convert document content data into a form specific to a particular printer for printing, and/or to generate a true print preview of the document for display on a display component of the client device 102.

Printer 104 is intended to represent any of a variety of printing devices, such as an inkjet printer, a laser printer, a single or multi-function printer, a large or small format printer, and so on. Printer 104 generally includes a processor (CPU) 208, memory 210, input/output devices 212 such as a keypad and a touch screen, and a print engine 214 to produce hardcopy documents/images on media such as paper, transparencies, and so on. Memory 210 includes both volatile (i.e., RAM) and nonvolatile (e.g., ROM, hard disk, floppy disk, CD-ROM, etc.) memory components comprising processor-readable media that provide for the storage of computer/processor-readable coded instructions, data structures, program modules and other data for printer 104.

As shown in FIG. 2, for example, memory 210 includes a "true print-preview print driver" 216 that has coded instructions executable on processor 208 to perform various tasks related to printing a document and generating a true document print preview for display on client computing device 102. Printing a document and generating a true document print preview are further facilitated by a color map LUT (look up table) 218, an ink level table 220, and a print quality LUT 222, also stored in memory 210.

In general, a user working within an application 206 executing on a client device 102 invokes the true print-preview print driver 216 by requesting or selecting a print preview of a document, or a hardcopy print of the document. The print driver 216 receives the document content data from the application 206, and converts the document content data into PCL in a form that the printer 104 understands for printing the document. More specifically, the print driver 216 converts RGB document data into CMYK data using the color map LUT 218. For example, the color map LUT 218 associates each color in RGB color space (e.g., as R, G, and B, vary between 0 and 255), with CMYK values varying between 0 and 1 for cyan, magenta, yellow, and black, and vice versa. As alluded to above, because the RGB color gamut is larger than the CMYK color gamut, converting RGB colors to CMYK colors results in numerous different RGB colors mapping to a single or the same CMYK color. Accordingly, fewer colors are available for printing a document in CMYK color space than are available for displaying the document in a print preview on a computer monitor in RGB color space. Therefore, when a user selects to print preview a document, the driver 216 converts the CMYK color data back to RGB color space using the same color map LUT 218. This conversion creates "converted" RGB color data that matches the CMYK color data on a one-to-one basis. That is, for each CMYK color value in the document, there is a singular matching converted RGB color value. The driver then generates a true print preview of the document using the converted RGB color data with the PCL print data. When the user prints the document from the printer, the CMYK colors appearing on the printed document will match the converted RGB colors displayed in the true document print preview.

In another implementation, the true print-preview print driver 216 additionally uses printer ink level information to generate a true document print preview. As noted above, when the driver 216 receives a print preview request with document content data from the application 206, it converts the document content data into PCL in part by converting RGB color data into CMYK color data. Because ink levels within the printer 104 can impact the quality and appearance of a printed document, the true print-preview print driver 216 operates to incorporate any such quality impact into a print preview of the document.

The driver 216 determines if printer ink levels will impact the print quality of a document by first creating an ink level table. FIG. 3 shows an example of an ink level table 300, according to an embodiment of the disclosure. Before printing a print job (i.e., a document), the driver 216 retrieves actual ink levels for each ink color (e.g., CMYK) from the printer 104. The driver 216 then uses the PCL document data to determine what the approximate ink levels will be for each ink color during printing of the document. More specifically, the driver 216 analyzes the PCL document data to determine how much of each ink color will be used in each print swath (i.e., the printed strip across the page that is created in one print pass, such as from a printhead), and then reduces each ink color level accordingly. Thus, as shown in FIG. 3, the ink level table 300 includes the actual ink levels initially retrieved from the printer 104 for each CMYK ink color, and then subsequent ink levels are determined after each swath of the PCL document data is considered. It should be apparent, therefore, that the ink level table 300 is generated prior to printing the document, and, that the document need not be printed at all in order for the driver 216 to generate the ink level table 300. Furthermore, it is noted that the ink level table 300 is used for the purpose of illustration only, and that an actual ink level table will most likely have many more swaths, and that the reductions in ink levels after each printed swath will not be as dramatic as those shown in the example table 300 of FIG. 3.

Figure 4:
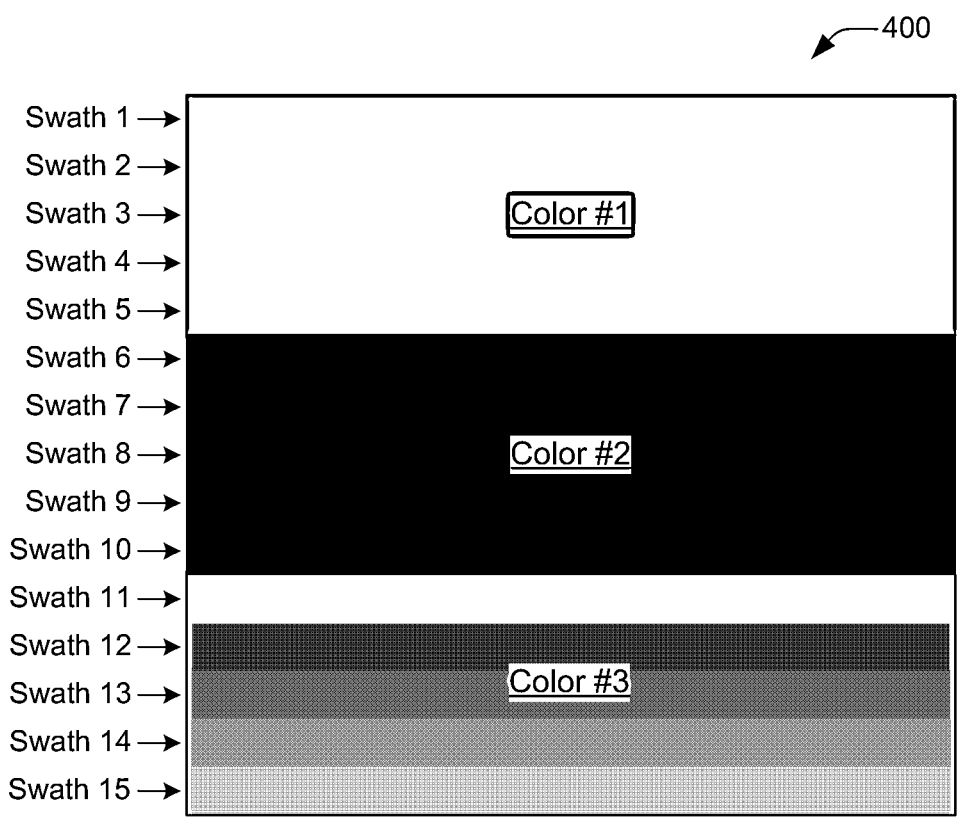
FIG. 4 shows an example image that is intended to correspond with the ink level table of FIG. 3, according to an embodiment.

FIG. 4 shows an example image 400 that is intended to correspond with the ink level table 300 of FIG. 3, according to an embodiment of the disclosure. FIG. 4 is intended to show the appearance of the image 400 both when the image 400 is printed from a printer 104, and when the image 400 is generated as a true print preview by print driver 216, as further discussed below. For the sake of simplifying the explanation, the three rectangular colors (color #1, #2, #3) of image 400 are assumed to correspond with five print swaths each, such that the whole image 400 includes 15 print swaths. It is noted, however, that image 400 is provided for the sake of illustration only, and that actual documents/images are typically made up of many more swaths than are shown in image 400 of FIG. 4.

Referring now to both FIGS. 3 and 4, let us assume that color #1 in the first rectangle of image 400 is a color made from a combination of the colors cyan and magenta. As shown in the ink level table 300 of FIG. 3, as each of the first 5 swaths is printed (i.e., swaths 1-5), only the cyan and magenta colors are reduced. In this example, after the first 5 swaths are printed, the cyan ink level has been reduced from 76% down to 66%, and the magenta ink level has been reduced from 82% down to 72%. The other colors in table 300 (i.e., yellow and black) are not used when printing the first 5 swaths, so their ink levels are therefore not reduced. In the second rectangle of image 400, color #2 is intended to be black. Thus, as each of the second 5 swaths is printed (i.e., swaths 6-10), only the black color in ink level table 300 is reduced. The black ink level in table 300 is reduced from 56% to 46%, while the other ink color levels remain the same. In the third rectangle of image 400, color #3 is intended to be yellow. As each of the third 5 swaths is printed (i.e., swaths 10-15), only the yellow color in ink level table 300 is reduced. The yellow ink level in table 300 is reduced from 16% to 4%, while the other ink color levels remain the same.

It is clear from the appearance of color #3 in image 400, that the print quality corresponding with the yellow ink color is degrading. The degrading print quality corresponds with the depletion of the yellow ink level below a minimum threshold (below 15% in this example). This is an example of the degradation that can occur in printed documents when ink levels in the printer 104 are depleted below certain threshold levels. While this print quality degradation is naturally apparent in printed documents as ink levels become depleted, the true print-preview print driver 216 employs the print quality LUT 222 to incorporate this information into the generation of true print previews.

FIG. 5 shows an example of a print quality LUT 222, according to an embodiment of the disclosure. The print quality LUT 222 associates ink levels (e.g., as % of full level) with print quality levels (e.g., as %). While the print quality LUT 222 shown in FIG. 5 provides print quality levels associated with a general ink level, in other implementations, quality LUTs can provide print quality levels associated with ink levels for each different color of ink.

After the print driver 216 generates the ink level table 300, as discussed above, it uses these ink levels in conjunction with print quality LUT 222 to determine if any ink levels are depleted to a point where print quality will be impacted. In the example quality LUT 222 of FIG. 5, it is apparent that for ink levels that remain at or above 15%, there is no print quality impact. However, when ink levels drop below 15%, the print quality begins to degrade. For example, from ink level table 300, after swath 11 is printed (or after it would be printed), the yellow ink level is reduced to 14%, which corresponds to a 95% print quality level in the print quality LUT 222. The print driver 216 therefore adjusts (i.e., degrades) the CMYK data value by 5% for the yellow color before converting the CMYK data back to "converted" RGB data. Likewise, for each of the yellow ink levels that are below the 15% level in table 300, the print driver 216 knows from the quality LUT 222 how much to adjust the yellow color before converting the CMYK data back to converted RGB data. After swath 12 is printed (or after it would be printed), for example, the 10% yellow ink level corresponds with a print quality level of 75%, and the driver 216 therefore degrades the yellow CMYK color data by 25%. Likewise, for yellow ink levels of 8%, 6%, and 4%, as shown in table 300, the driver 216 consults the quality LUT 222 and degrades the yellow CMYK color data by 35%, 45%, and 60%, respectively.

Once the print quality adjustments have been made to the CMYK color data based on the ink levels from table 300, the driver 216 converts the CMYK color data values back to "converted" RGB color data values using the color map LUT 218, as discussed above. The print driver 216 then uses the PCL document data with the converted RGB color data to draw/generate each swath of the image 400 in a print preview. Because both the color map conversion and the ink level adjustments have been accounted for in the generation of the print preview, the preview will be a true print preview that matches the appearance of the image 400 when it is printed by printer 104. Thus, as noted above, image 400 as shown in FIG. 4 illustrates the appearance of the image both when it is printed by printer 104 and when it is generated in a true print preview by print driver 216.

Figure 6:
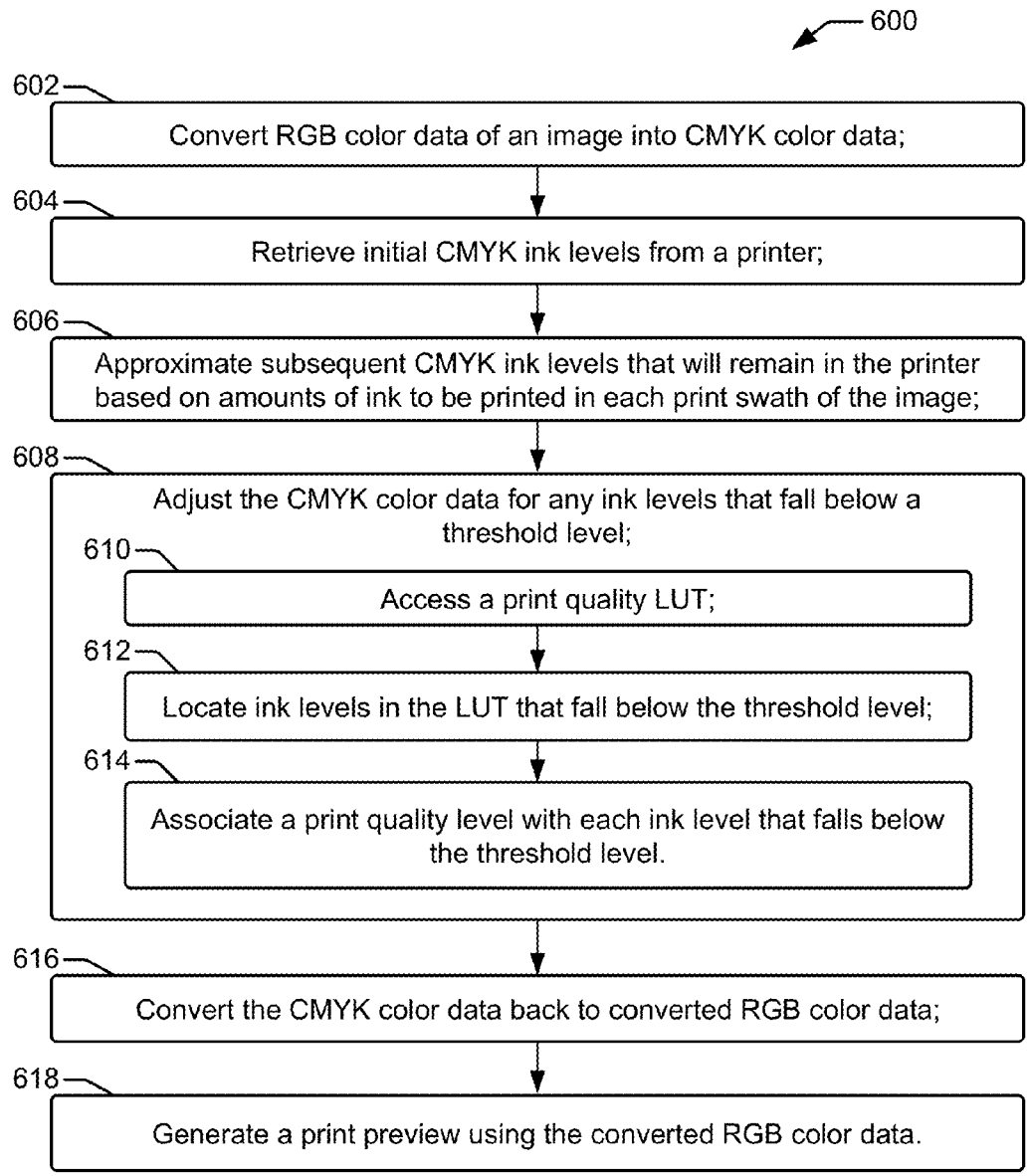
FIG. 6 shows a flowchart of an example method related to generating a print preview, according to an embodiment.
Figure 7:
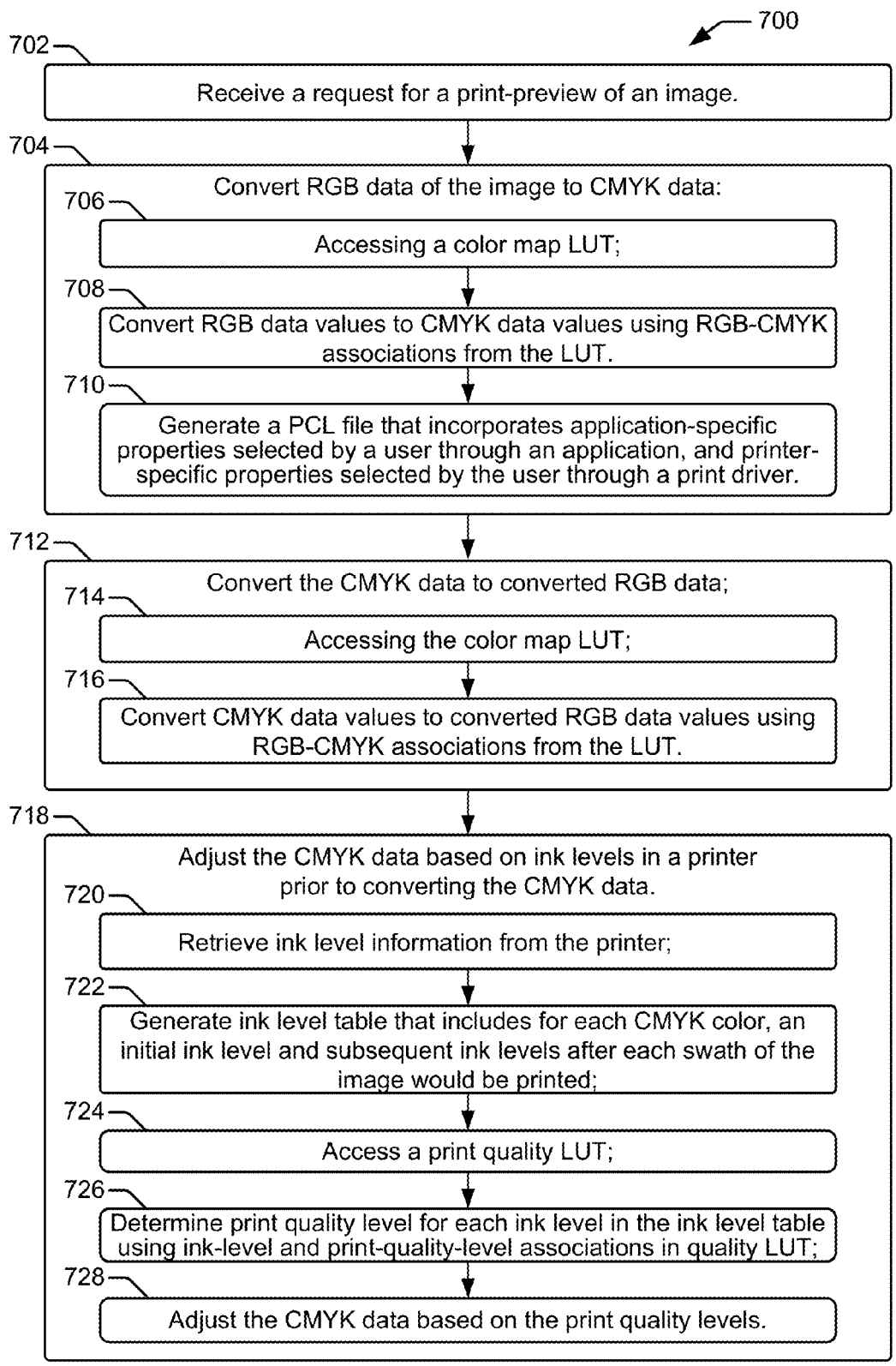
FIG. 7 shows a flowchart of another example method related to generating a print preview, according to an embodiment.

FIGS. 6 and 7, show flowcharts of example methods 600 and 700, related to generating a print preview, according to embodiments of the disclosure. Methods 600 and 700 are associated with the embodiments discussed above with regard to FIGS. 1-5, and details of the steps shown in methods 600 and 700, can be found in the related discussion of such embodiments. The steps of methods 600 and 700, may be embodied as programming instructions stored on a computer/processor-readable medium, such as memory 202 and 210 of FIG. 1. In an embodiment, the implementation of the steps of methods 600 and 700, is achieved by the reading and execution of such programming instructions by a processor, such as processor 200 and 208 of FIG. 1. Methods 600 and 700, may include more than one implementation, and different implementations of methods 600 and 700, may not employ every step presented in the respective flowcharts. Therefore, while steps of methods 600 and 700, are presented in a particular order within their respective flowcharts, the order of their presentation is not intended to be a limitation as to the order in which the steps may actually be implemented, or as to whether all of the steps may be implemented. For example, one implementation of method 700 might be achieved through the performance of a number of initial steps, without performing one or more subsequent steps, while another implementation of method 700 might be achieved through the performance of all of the steps.

Method 600 of FIG. 6, begins at block 602, where the first step shown is to convert RGB color data of an image into CMYK color data. At block 604, the method 600 continues with retrieving initial CMYK ink levels from a printer. At block 606 of method 600, subsequent CMYK ink levels that will remain in the printer after each swath of the image is printed, are approximated based on amounts of ink to be printed in each print swath of the image. The amount of ink to be printed in each swath is determined from the PCL data generated by the driver from the document/image content data.

At block 608, the method 600 continues with adjusting the CMYK color data for any ink levels that fall below a threshold level. This can include accessing a print quality LUT, locating ink levels in the LUT that fall below the threshold level, and associating a print quality level with each ink level that falls below the threshold level, as shown at blocks 610, 612, and 614, respectively. The method 600 continues at block 616, with converting the CMYK color data back to converted RGB color data. Then at block 618 of method 600, a print preview is generated by the print driver using the converted RGB color data.

Method 700 of FIG. 7, begins at block 702, where the first step shown is to receive a request for a print-preview of an image. Such a request typically comes from an application executing on a client computing device coupled to a printer. At block 704 of method 700, RGB data of the image is converted to CMYK data. This conversion can include accessing a color map LUT, converting RGB data values to CMYK data values using RGB-CMYK associations from the LUT, and generating a PCL file that incorporates application-specific properties selected by a user through an application, and printer-specific properties selected by the user through a print driver, as shown at blocks 706, 708, and 710, respectively of method 700.

The method 700 continues at block 712, with convert the CMYK data to converted RGB data. This conversion can include accessing the color map LUT, and converting CMYK data values back to converted RGB data values using RGB-CMYK associations from the LUT, as shown at blocks 714 and 716, respectively.

At block 718, the method 700 includes adjusting the CMYK data based on ink levels in a printer. This adjustment occurs prior to converting the CMYK data back to converted RGB data. Adjusting the CMYK data can include retrieving ink level information from the printer, generating an ink level table that includes, for each CMYK color, an initial ink level and subsequent ink levels after each swath of the image would be printed, accessing a print quality LUT, determining print quality levels for each ink level in the ink level table using ink-level and print-quality-level associations within the quality LUT, and adjusting the CMYK data based on the print quality levels, as shown at blocks 722-728, respectively.

What is claimed is:

1. A non-transitory processor-readable medium storing code representing instructions that when executed by a processor cause the processor to:

receive a request for a print-preview of an image;
convert RGB data of the image to CMYK data using a color map associated with a specific printer;
retrieve ink level information from the specific printer;
determine a first ink level for a first ink for a CMYK color after a first swath of the image would be printed in the specific printer;
adjust the CMYK data based on the determined first ink level;
determine a second ink level for the first ink for the CMYK color after a second swath of the image would be printed subsequent to the first swath in the specific printer;
adjust the CMYK data based on the determined second ink level in the specific printer;
convert the CMYK data adjusted based on the determined second ink level to converted RGB data using the color map; and
generate the print-preview of the image with the converted RGB data.

2. The processor-readable medium of claim 1, wherein adjusting the CMYK data comprises:
generating an ink level table that includes for each CMYK color, an initial ink level and subsequent ink levels of the image would be printed, wherein each subsequent ink level corresponds to an ink level for a CMYK color after a corresponding swath of the image would be printed.

3. The processor-readable medium of claim 2, wherein adjusting the CMYK data further comprises:
accessing a print quality LUT;
determining a print quality level for each ink level in the ink level table using ink-level and print-quality-level associations within the print quality LUT; and
adjusting the CMYK data based on the print quality levels.

4. The processor-readable medium of claim 1, wherein converting the RGB data of the image to the CMYK data comprises:
accessing a color map LUT; and
converting RGB data values to CMYK data values using RGB-CMYK associations from the color map LUT.

5. The processor-readable medium of claim 4, wherein converting the CMYK data to the converted RGB data comprises:
converting CMYK data values to converted RGB data values using RGB-CMYK associations from the color map LUT.

6. The processor-readable medium of claim 1, wherein converting the RGB data of the image to the CMYK data comprises:
generating a printer command language (PCL) file that incorporates application-specific properties determined through an application, and printer-specific properties determined through a print driver.

7. A client device comprising the processor-readable medium of claim 1, wherein the code comprises a printer driver executable on a processor of the client device.

8. The processor-readable medium of claim 1, wherein adjusting the CMYK data based on the determined first ink level comprises:
adjusting the CMYK color data responsive to the determined first ink level being below a threshold ink level.

9. A printer comprising
a memory storing a print driver to:
receive a request for a print-preview of an image;
convert RGB data of the image to CMYK data using a color map associated with a specific printer;
retrieve ink level information from the specific printer;
determine a first ink level for a first ink for a CMYK color after a first swath of the image would be printed in the specific printer;
adjust the CMYK data based on the determined first ink level;
determine a second ink level for the first ink for the CMYK color after a second swath of the image would be printed subsequent to the first swath in the specific printer;
adjust the CMYK data based on the determined second ink level in the specific printer;
convert the CMYK data adjusted based on the determined second ink level to converted RGB data using the color map; and
generate the print-preview of the image with the converted RGB data.

10. The printer of claim 9, wherein adjusting the CMYK data comprises:
generating an ink level table that includes for each CMYK color, an initial ink level and subsequent ink levels of the image would be printed, wherein each subsequent ink level corresponds to an ink level for a CMYK color after a corresponding swath of the image would be printed.

11. The printer of claim 9, wherein converting the RGB data of the image to the CMYK data comprises:
accessing a color map LUT; and
converting RGB data values to CMYK data values using RGB-CMYK associations from the color map LUT.

12. The printer of claim 11, wherein converting the CMYK data to the converted RGB data comprises:
converting CMYK data values to converted RGB data values using RGB-CMYK associations from the color map LUT.

13. The printer of claim 9, wherein converting the RGB data of the image to the CMYK data comprises:
generating a printer command language (PCL) file that incorporates application-specific properties determined through an application, and printer-specific properties determined through a print driver.

14. The printer of claim 9, wherein adjusting the CMYK data based on the determined first ink level comprises:
adjusting the CMYK color data responsive to the determined first ink level being below a threshold ink level.

15. A non-transitory processor-readable medium storing code representing instructions that when executed by a processor cause the processor to:
convert RGB color data of an image into CMYK color data using a color map associated with a specific printer;
retrieve initial CMYK ink levels from the specific printer;
approximate subsequent CMYK ink levels that will remain in the specific printer based on amounts of ink that will be printed for a first print swath of the image;
adjust the CMYK color data for any ink levels that fall below a threshold level;
approximate second CMYK ink levels that will remain in the specific printer based on amounts of ink that will be printed for a second print swath of the image to be printed subsequent to the first print swath;
adjust the CMYK color data for any ink levels that fall below the threshold level after the approximation of second CMYK ink levels;
convert the adjusted CMYK color data back to converted RGB color data; and
generate a print preview using the converted RGB color data such that the print preview is realistic relative to said specific printer.

16. The processor-readable medium of claim 15, wherein adjusting the CMYK color data comprises:

accessing a print quality LUT;
locating ink levels in the print quality LUT that fall below the threshold level; and
associating a print quality level with each ink level that falls below the threshold level.

17. The processor-readable medium of claim 15, further comprising generating a PCL comprising the converted RGB color data for the print-preview request.

18. The processor-readable medium of claim 15, wherein generating the print preview further comprises using printer-specific properties such that the print preview is specific to the specific printer.

19. The printer of claim 10, wherein adjusting the CMYK data further comprises:
accessing a print quality LUT;
determining a print quality level for each ink level in the ink level table using ink-level and print-quality-level associations within the print quality LUT; and
adjusting the CMYK data based on the print quality levels.

* * * * *